(12) United States Patent
Trischitta

(10) Patent No.: US 7,171,125 B1
(45) Date of Patent: Jan. 30, 2007

(54) POWER FEED ARRANGEMENT USING AGGREGATE SEGMENTS

(75) Inventor: Patrick Ross Trischitta, Holmdel, NJ (US)

(73) Assignee: Tyco Telecomminications (US) Inc., Morristown, NJ (US)

( * ) Notice: Subject to any disclaimer, the term of this patent is extended or adjusted under 35 U.S.C. 154(b) by 0 days.

(21) Appl. No.: 10/350,686

(22) Filed: Jan. 24, 2003

Related U.S. Application Data

(62) Division of application No. 09/413,792, filed on Oct. 7, 1999.

(51) Int. Cl.
*H04B 10/00* (2006.01)

(52) U.S. Cl. .................................. 398/104; 398/105
(58) Field of Classification Search .................... 398/2, 398/4, 6, 104, 105, 141, 171, 173, 178
See application file for complete search history.

(56) References Cited

U.S. PATENT DOCUMENTS

| | | | | |
|---|---|---|---|---|
| 5,214,312 A | * | 5/1993 | Inoue | 307/43 |
| 5,489,897 A | * | 2/1996 | Inoue | 340/870.39 |
| 5,491,368 A | * | 2/1996 | Yamamoto | 307/113 |
| 5,526,157 A | * | 6/1996 | Kawano | 398/1 |
| 5,841,205 A | * | 11/1998 | Webb | 307/130 |
| 6,078,008 A | * | 6/2000 | Wood et al. | 174/44 |
| 6,166,836 A | * | 12/2000 | Crameri et al. | 398/18 |

OTHER PUBLICATIONS

CA AT&T Technical Journal, A Journal of the AT&T Companies, "Undersea Communications Technology", Jan./Feb. 1995, vol. 74, No. 1.

* cited by examiner

*Primary Examiner*—Dalzid Singh
(74) *Attorney, Agent, or Firm*—Grossman, Tucker, Perreault & Pfleger PLLC

(57) ABSTRACT

A power feed arrangement for aggregate segments of a communications system is disclosed. In embodiments of the invention, cables are used to communicatively connect a number of landmasses, where the cables also serve to carry electrical power to devices connected along lengths of the cables. A first cable is connected to first and second landmasses, while a second cable is connected to second and third landmasses. On the second landmass, the electrical power conductors of the first and second cables are electrically connected to one another, and pieces of power feed equipment located on said first and third landmasses are used to supply electrical power to devices located along lengths of the first and second cables. Alternative embodiments are also disclosed.

5 Claims, 8 Drawing Sheets

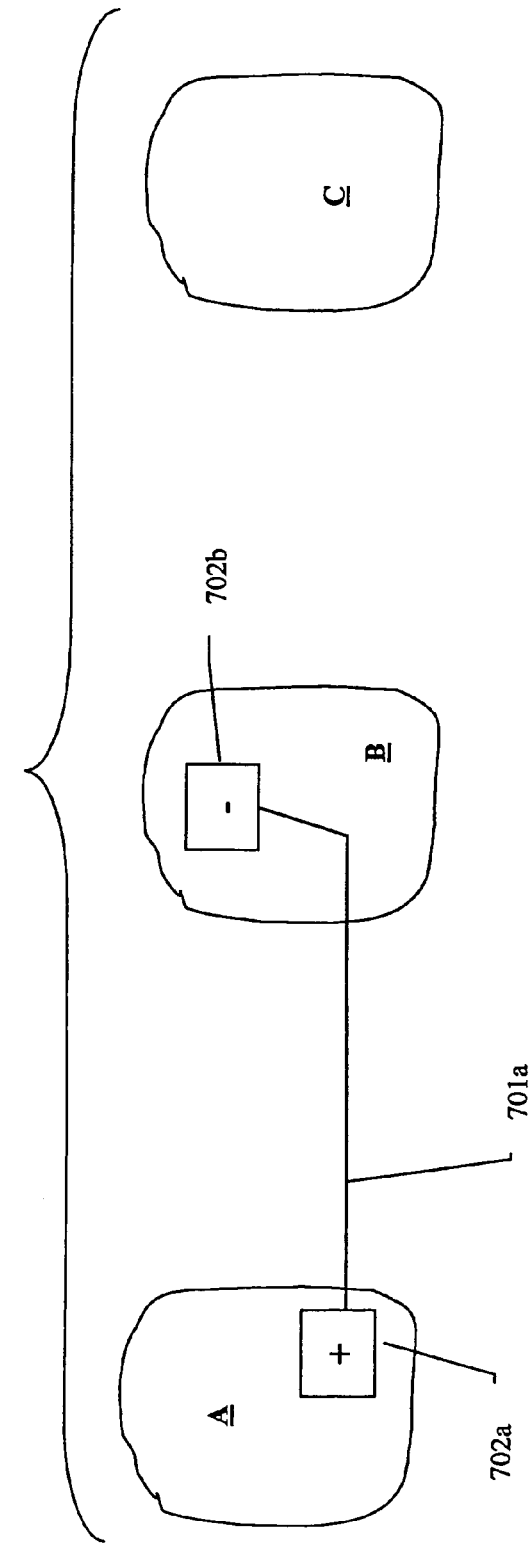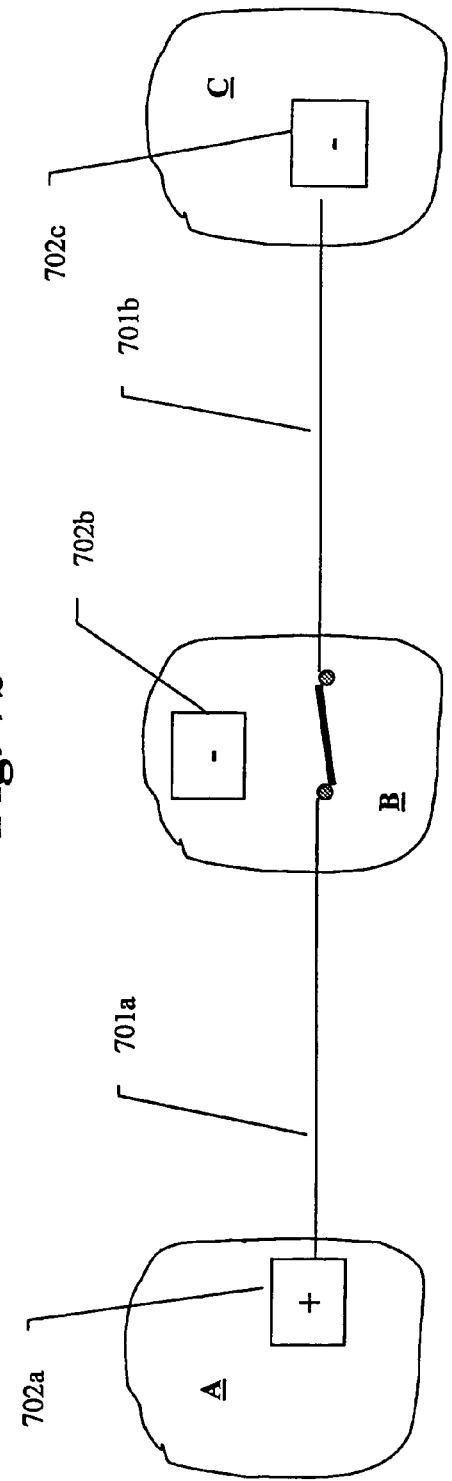
Fig. 7a
**Fig. 7b

POWER FEED ARRANGEMENT USING AGGREGATE SEGMENTS

CROSS REFERENCE TO RELATED APPLICATION

This is a divisional application of application Ser. No. 09/413,792, filed on Oct. 7, 1999, entitled "Power Feed Arrangement Using Aggregate Segments".

TECHNICAL FIELD OF THE INVENTION

The present invention relates generally to the field of communications in which signals are carried over extended distances. In particular, the present invention relates to undersea communications networks, and the equipment forming such networks. Even more particularly, the present invention relates to the way in which electrical power is supplied to the various components of such communication systems.

DESCRIPTION OF THE RELATED ART

The ability to transmit data over vast distances has become critical in today's Information Age. Geographic boundaries, such as oceans, are no longer considered to be impediments to communication.

In trans-oceanic communication systems, a cable, having sufficient armor and insulation against underwater hazards, is typically laid across the ocean floor, sometimes for hundreds, or even thousands, of miles. At each end, the cable extends out of the ocean, onto land, and eventually into a cable station. In the cable station, the cable is connected to communications equipment that is capable of detecting the various signals transmitted via the cable. These signals are then received, processed, and routed to their final destination using land-based communication networks.

While the first trans-oceanic networks relied on cables containing metal wire (e.g., copper wire), modern developments in communications technology have yielded a new favorite: the optical fiber. An optical fiber has a much greater transmission capacity than its metal-based counterparts, and offers many additional advantages as well. For example, optical fiber tends to weigh less than metal wire, and is not susceptible (and does not cause) electromagnetic interference. While optical fiber does have its drawbacks (e.g., limited bend radius, difficulty of splicing), these drawbacks are not usually a problem in undersea networks, which can span hundreds of miles with straightforward routing and minimal post-installation splicing or modification.

FIG. 1a is a schematic diagram that shows a basic point-to-point optical communication segment between two points. Each point has a cable station 101a, 101b that is connected to a cable 102 which contains one or more optical fibers through which optical signals may be sent. Modern optical technology, however, cannot feasibly produce perfect optical fibers, and as a result, optical signal degradation is inevitable. This degradation puts a limit on the length of the optical fibers within cable 102, and typical optical fibers are limited to under 500 km.

FIG. 1b is a schematic diagram that shows a modified point-to-point optical communication segment that employs an optical repeater 103 to extend the range of the optical fibers in cable 102. Optical repeater 103 simply receives incoming wavelengths of light from the optical fibers within a first section 102a of the cable, amplifies the light using, for example, erbium-doped fiber and an optical pump, and then transmits the amplified light using the optical fibers in the next section 102b of the cable. An exemplary optical repeater is the one used in the SL2000 underwater optical system, manufactured by AT&T. Using such a system, a large number of repeaters 103 may be used to extend the range between the two points up to 9,000 km.

The optical repeater 103 requires electrical power to operate, but is not typically located near a power source. To overcome this problem, the repeater 103 receives its electrical power via the cable 102. FIG. 2 shows a cross-section view of a typical optical cable 102. The cable 102 includes one or more layers of insulation or armor 201. Within the cable 102, there may be any number of individual optical fibers 202, each of which has its own insulation, cladding and core (not shown). At the center of the cable 102 is a power conductor 203, and it is this power conductor 203 that supplies the repeater 103 with its power. Other cable designs having data carrying lines, such as optical fibers, and a power conductor have also been used.

Referring to FIG. 3, all of the repeaters 103 along a cable 102 may be powered in series by a constant current supplied on the power conductor 203 of cable 102. This constant current is provided by power feed equipment (PFE) 301a, 301b located at both ends of the cable 102, as shown in FIG. 3. For the AT&T SL2000, a 48 volt battery power source is used to generate a constant current of 0.92 amps with a maximum voltage of +/−7500 volts at each PFE 301a, 301b. The power conductor 203 (within cable 102) is connected to a positive terminal at one PFE 301a, and a negative terminal at the other PFE 301b. At each PFE, the terminal that is not connected to the power conductor 203 is connected to a ground potential, typically the ocean itself, to complete the circuit.

As the demand for communications services grows, more and more undersea communication segments are added. These segments may be "non-repeatered," as shown in FIG. 1a, or they may be "repeaterred," as shown in FIG. 1b. Each segment is installed having the necessary equipment (PFEs, branching units, repeaters, etc.) to sustain communications between two (or more, if branching units are used) cable stations, such as cable stations 101a and 101b. This results in power feed configurations such as the one shown in FIG. 4. In the FIG. 4 system, a first undersea communications segment 401 is located between landmasses A and B, and powered by PFEs 403 and 404, while a second segment 402 is located between landmasses B and C, and is powered by PFEs 405 and 406.

The system shown in FIG. 4 provides communication services between inland communication networks on landmasses A, B and C. Unfortunately, the high cost of installing and operating such segments usually limits the number of segments that can be installed. For example, in FIG. 4, landmass D is not connected to any of landmasses A, B and C. Accordingly, there is a need for configurations, methods and systems which reduce the cost of undersea communication segments, and which may allow additional segments to be installed.

SUMMARY OF THE INVENTION

The present invention provides a system and method that can reduce the cost of installing and operating communication systems having multiple segments. In a preferred embodiment, two segments connect a first landmass to two other landmasses. On the first landmass, the power conductors of the two segments are coupled to one another, and the two segments are powered by power feed equipment located on the two other landmasses. It may then be possible to power the two segments without using power feed equipment on the first landmass.

In a preferred embodiment of a method of the present invention, communication systems may be designed and installed such that intermediate power feed equipment on the first landmass described above are not necessary for the two segments. In an alternate embodiment, a new segment being connected to a landmass having an existing power feed equipment can be installed on the landmass without needing a new piece of power feed equipment on the landmass.

SUMMARY OF THE FIGURES

FIGS. 7a and 7b are simplified views of steps according to a method of the present invention.

DETAILED DESCRIPTION OF THE PREFERRED EMBODIMENTS

Figure 5:
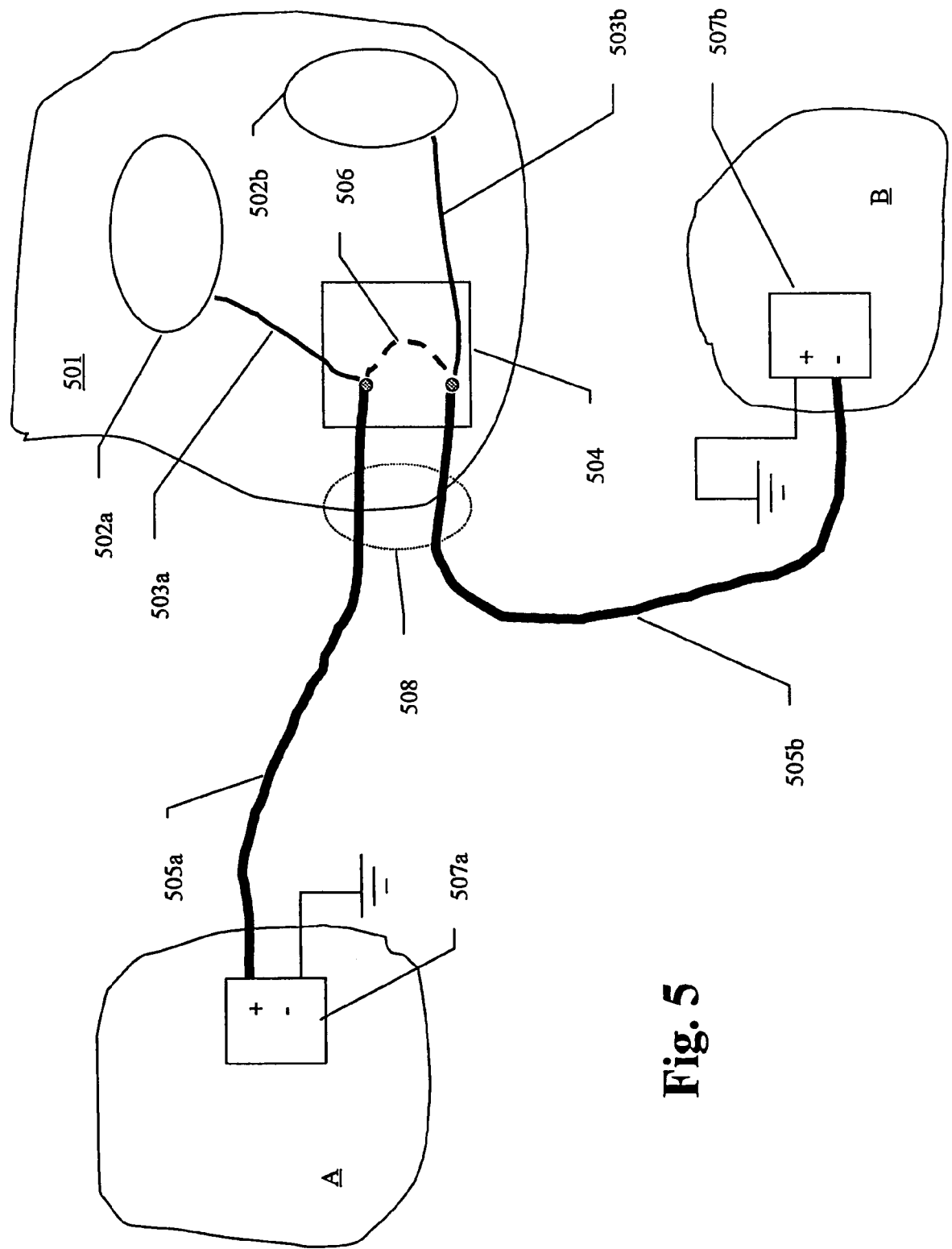
FIG. 5 is a simplified view of a first embodiment of the present invention.

FIG. 5 is a simplified diagram of the preferred embodiment of the present invention. In FIG. 5, a landmass 501, which may be an island, continent, etc., is shown having inland communication networks 502a and 502b. Communication networks 502a and 502b may include any number of devices that are communicatively coupled for transmission and/or reception of data signals. Exemplary communication networks 502a and 502b may be telephone networks, cable television networks, computer networks (e.g., the internet), or the like.

The communication networks 502a and 502b are connected, via data signal lines 503a and 503b, respectively, to cable station 504. Within cable station 504, the data signal lines 503a and 503b may be directly coupled to the data signal carrying portions of cables 505a and 505b, respectively. Alternatively, some or all of the data signal lines 503a and 503b may be of a different nature, or carry different signals, from the data signal carrying portions of cables 505a and 505b. For example, the data signal lines 503a and 503b, or a portion thereof, may carry electrical signals, while the corresponding data signal carrying portion of cables 505a and 505b may be optical. In this alternate embodiment, some or all of the data signals will need to be converted, using any known devices for conversion between the two formats for transmission on these lines.

Figure 1A:
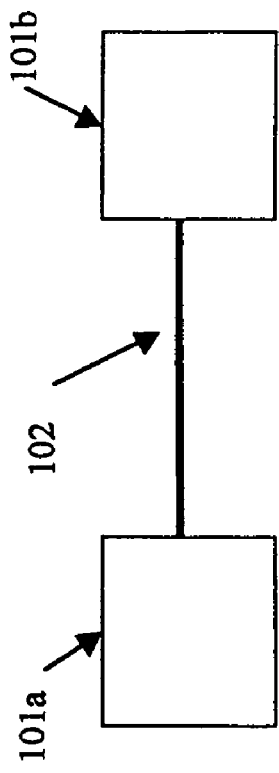
FIGS. 1a and 1b are schematic diagrams that show typical point-to-point communication systems used in the prior art.
Figure 1B:
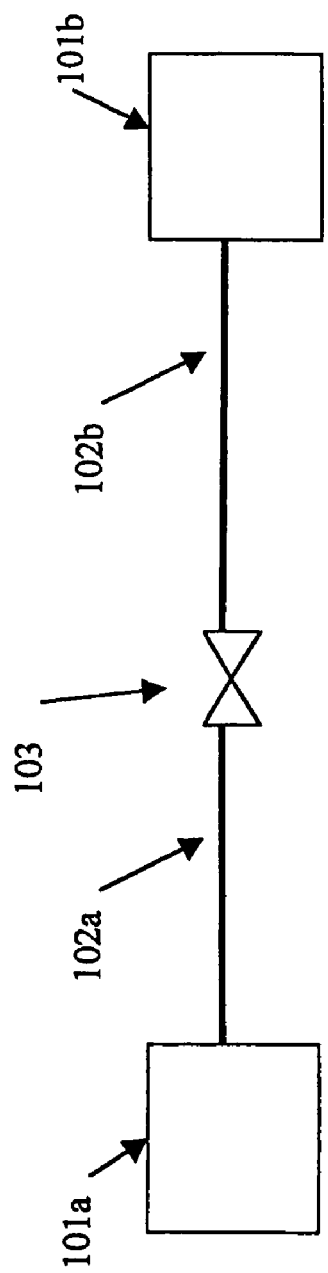
Figure 2:
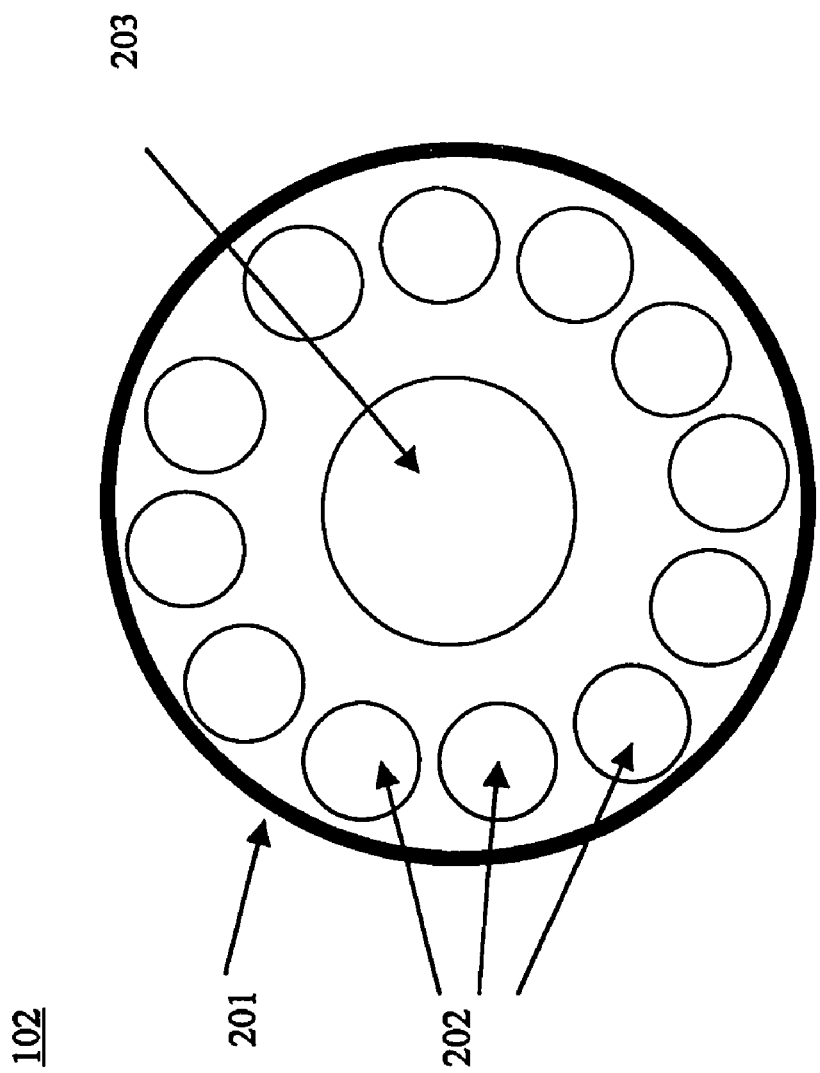
FIG. 2 is a cross-section view of a typical optical fiber as used in the prior art.
Figure 3:
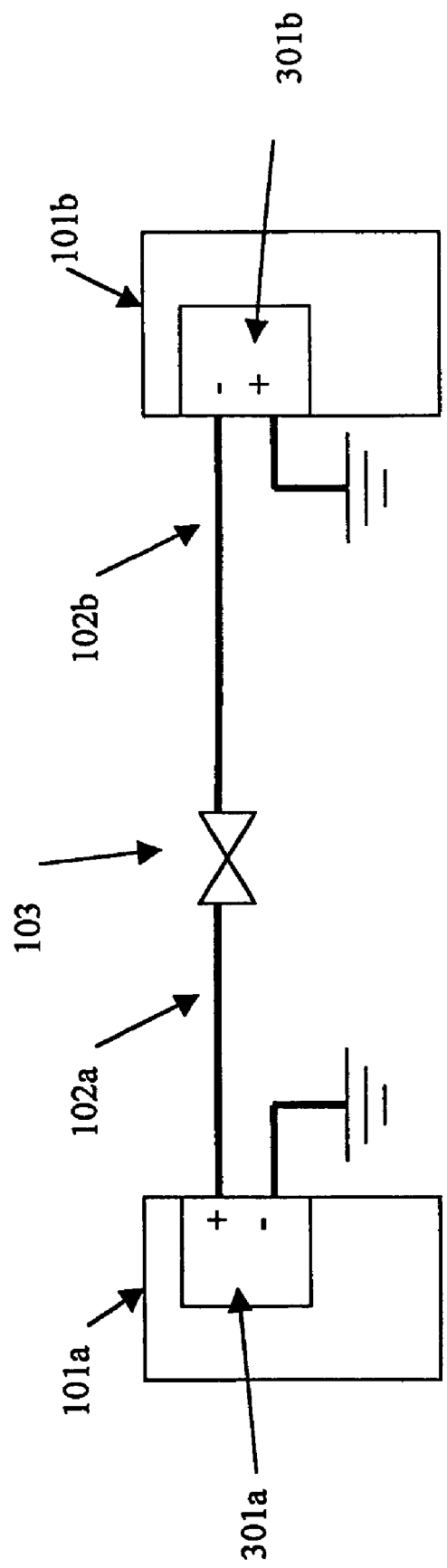
FIG. 3 is a schematic diagram that shows the power feed configuration used in prior art communication networks.

Cables 505a and 505b may be optical in nature, and may have structures similar to that shown in FIG. 2. Cables of different structures may also be used, provided they have a data signal carrying portion and an electrical power carrying portion. The power conductors of cables 505a and 505b may be electrically connected to one another using power connector 506. Power connector 506 may be of any type of conductive wiring or cabling that is acceptable for carrying the electrical power signals carried on the power conductors of cables 505a and 505b. For example, the power connector 506 may be an insulated copper cable of sufficient gauge to carry the current carried on the power conductors of cables 505a and 505b. Alternatively, the power connector 506 may be accomplished using a length of cable identical in cross-sectional structure to the cables 505a and 505b, where the power conductor in this length of cable is used as power connector 506. In a further aspect of this alternate embodiment, the data signal carrying portion of this length of cable may simply be left unused.

If desired, some or all of the data signal carrying portions of cables 505a and 505b may also be connected to one another to allow, for example, communications between communication networks of landmasses A and B. The data signal carrying portions of cables 505a and 505b may also be connected to one another through an additional device, such as a splicer, to allow communication between networks 502a, 502b and any of the networks of landmasses A and B.

From cable station 504, cables 505a and 505b extend out of landmass 501, into the water (sea, ocean, etc.) and eventually to landmasses A and B, respectively. Cable 505a (as well as 505b) need not be a continuous, uninterrupted cable, and may instead be comprised of a number of smaller lengths of cable with devices, such as optical repeaters, connected in between. These devices are not shown in FIG. 5, and for simplicity's sake, cable segment 505a (and 505b) is referred to as a "cable." However, one of ordinary skill in the art of communications will understand that cables 505a and 505b, and the cable segments described herein, may include various devices such as repeaters connected along their lengths.

At landmass A, the data signal carrying portions of cable 505a are connected to a communication network (not shown) located on landmass A. The power conductor of cable 505a may be connected to a positive terminal of power feed equipment 507a. Power feed equipment 507a may be of any commercially available type that is suitable to power devices that may be located along the length of cables 505a and 505b. The negative terminal of power feed equipment 507a may be connected to a ground, such as the ocean itself.

A similar construction may be used at landmass B, where the data signal carrying portions of cable 505b are connected to a communication network (not shown) located on landmass B, and the power conductor of cable 505b is connected to a negative terminal of power feed equipment 507b, which is simlar to power feed equipment 507a. The positive terminal of power feed equipment 507b may also be connected to a ground, such as the ocean itself.

In this configuration, the power feed equipment 507a and 507b form an electrical circuit using the grounds, the cables 505a and 505b, and the power connector 506. This circuit supplies the current needed to power, in series, the various devices (such as optical amplifiers) that may be connected along the length of cables 505a and/or 505b.

In FIG. 5, the cables 505a and 505b may have a common landing point 508, defined by the area in which the cables enter landmass 501. Having a common landing point minimizes the area on landmass 501 that must be accessed, and allows the cables 502a and 502b to be easily routed to cable station 504, within which the power conductors of the cables may be connected to one another.

Figure 5B:
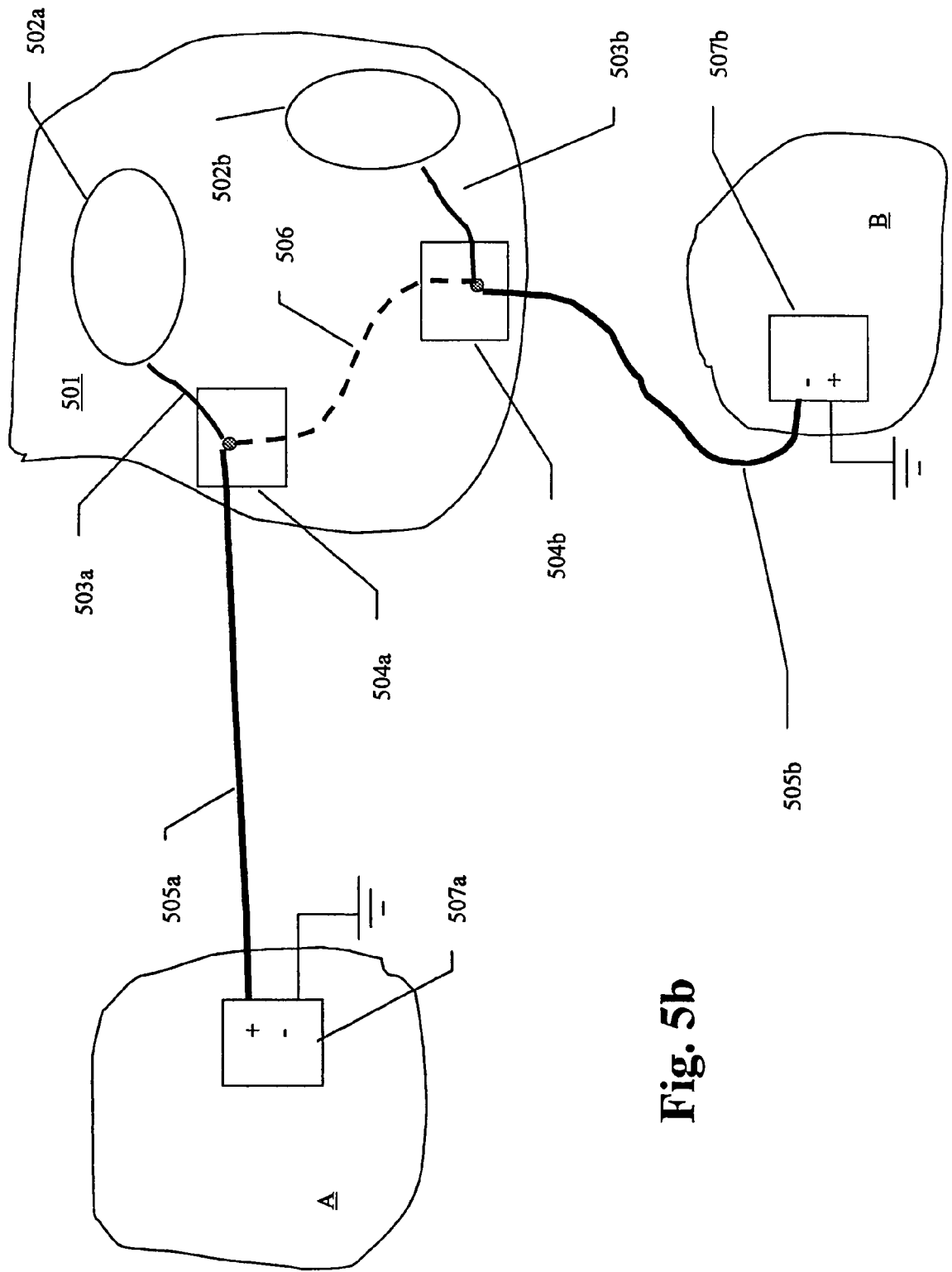

In an alternate embodiment (shown in FIG. 5b), cables 505a and 505b may have different landing points, and may each enter different cable stations. In such an alternate embodiment, the power connector 506 may need to be routed over portions of landmass 501 to connect the power conductors of cables 505a and 505b. This embodiment, however, may still be preferred over having separate power feed equipment on, for example, opposite sides of an island. The advantages of the preferred embodiment, however, may still be achieved in this alternate embodiment as long as the power conductors of cables 505a and 505b are electrically connected to one another.

In FIG. 5, communication networks 502a and 502b are shown as being separate from one another. For example, network 502a may be a cable television network that uses cable 505a to supply television programming to customers on landmass A. Network 502b, on the other hand, might be a telephone network that supplies telephone services to residents on landmass B. In this exemplary situation, the two networks 502a and 502b may be different from one another, and might not share any data with one another. However, while the cables used to carry their respective signals (505a and 505b) do not share data signals, they may nevertheless benefit from the preferred embodiments of the present invention by sharing the electrical power used to power segments 505a and 505b.

In an alternative embodiment (not shown), networks 502a and 502b may in fact be connected to one another, and may comprise a single communication network. For example, networks 502a and 502b may both be telephone networks that use a plurality of data signal lines (503a and 503b) to communicate with landmasses A and B. These telephone networks may also be configured to communicate with one another, and as a result, may be considered to be a single communication network on landmass 501.

Figure 4:
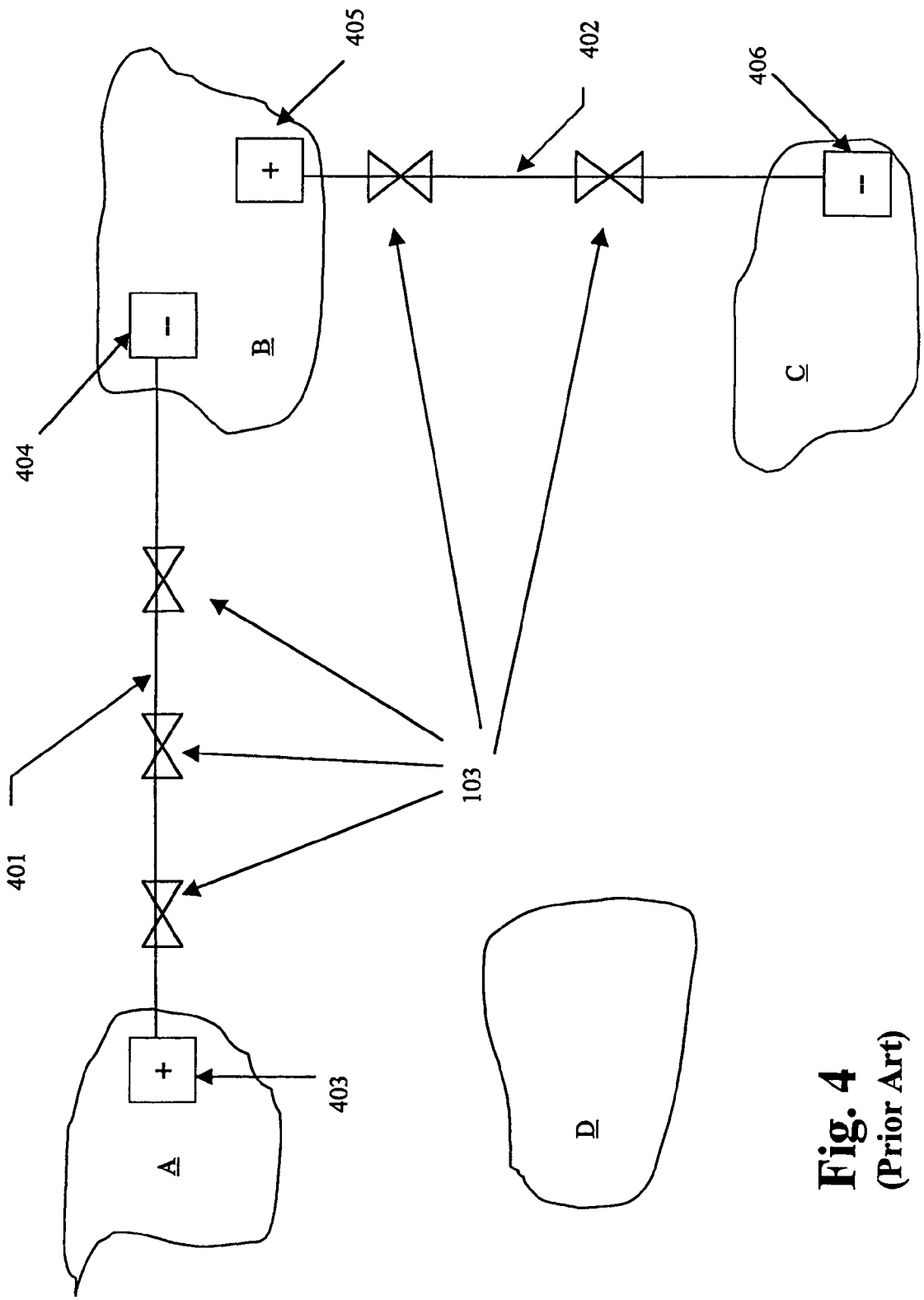
FIG. 4 is a schematic diagram that shows an extended power feed configuration used in prior art communication networks.

Using the embodiment shown in FIG. 5, the devices of two cable segments 505a and 505b may be powered by a single pair of power feed equipment 507a and 507b providing significant savings in installing and operating the communication system using these cable segments. In the prior art system of FIG. 4, the two segments are powered by two pair of power feed equipment (403/404 and 405/406), doubling the pieces of required power feed equipment, and increasing the costs of installation and operation.

Figure 6:
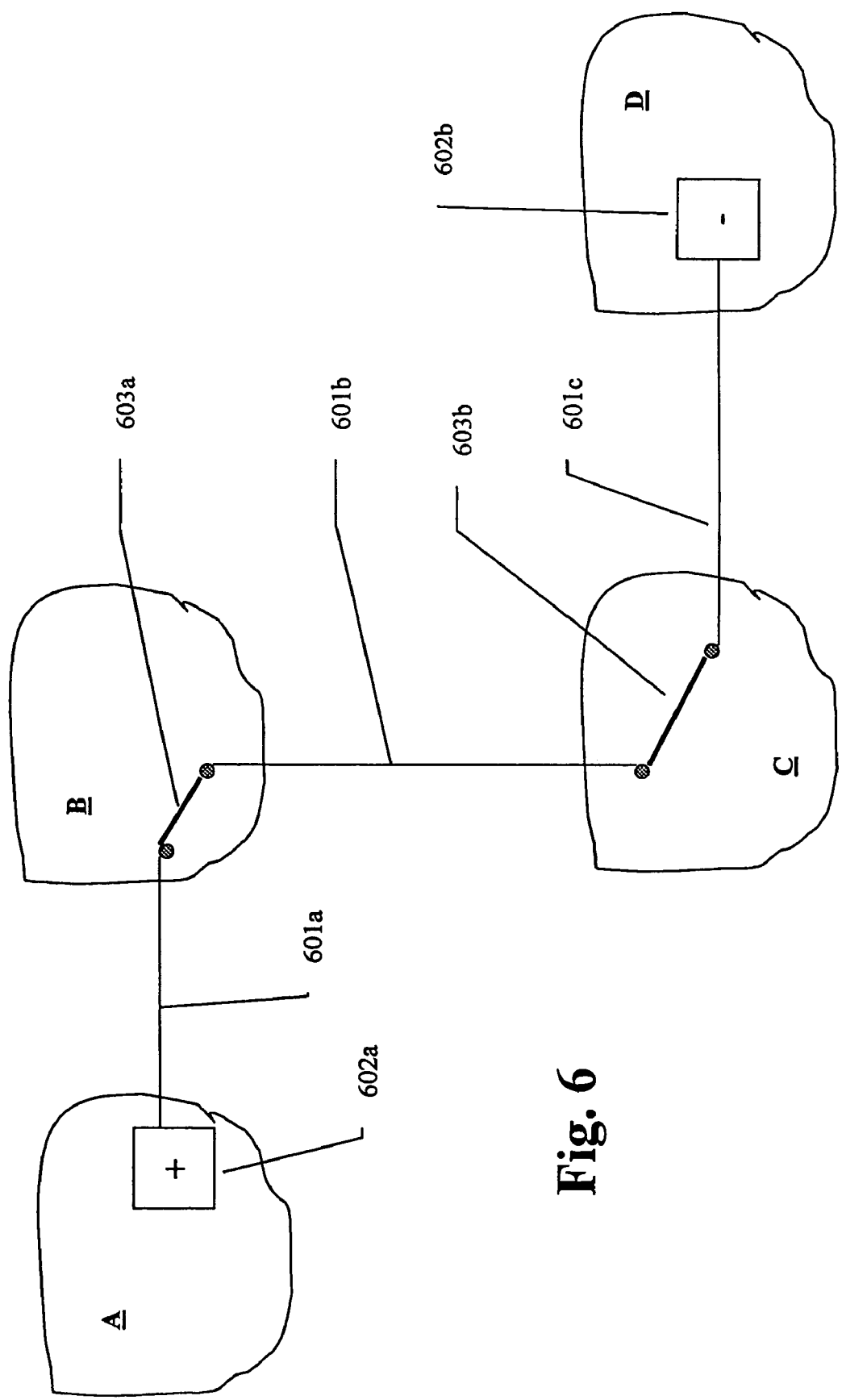
FIG. 6 is a schematic diagram of an alternate embodiment of the present invention.

FIG. 6 shows another alternate embodiment, in which a plurality of segments 601a, 601b and 601c share a single pair of power feed equipment 602a and 602b. At landmass B, the power conductors of cables 601a and 601b are electrically connected to one another, while at landmass C, the power conductors of cables 601b and 601C are electrically connected to one another. A positive terminal of power feed equipment 602a is electrically connected at landmass A to one end of cable 601a, while a negative terminal of power feed equipment 602b is connected at landmass D to an end of cable 601c. Landmasses B and C, however, do not need separate power feed equipment to power segments to which they are connected. Instead, they merely need power connectors 603a and 603b to connect the various power conductors of their respective cables. It will be readily understood by those skilled in the art of communications that a large number of segments may be "chained" together in this fashion. Each segment in such a "chain" need only have their power conductors connected to allow, for example, electrical current used to power devices located along the various segments 601a, 601b, and 601c. The data signal carrying portions, or lines, of these segments (such as the optical fibers in the cables) need not be connected to one another, and may in fact be isolated from one another.

FIGS. 7a and 7b are basic diagrams that show a method according to an exemplary embodiment of the present invention. In FIG. 7a, the power conductor of an existing segment 701a is shown, where cable 701a connects the communication networks of landmasses A and B (not shown). The power conductor of cable 701a is connected to a positive terminal at power feed equipment 702a on landmass A, and a negative terminal at power feed equipment 702b on landmass B. It is then desired to connect the communication network(s) of landmass C to those of A, B, or both.

In FIG. 7b, an additional cable 701b having a power conductor is installed between landmasses B and C. An additional piece of power feed equipment 702c is installed at landmass C to provide a negative voltage connection for cable 701b, while power feed equipment 702b is disconnected from the power conductor of cable 701a. Power feed equipment 702b might be removed, sold, and/or otherwise disposed of as being no longer needed. In an alternative embodiment, power feed equipment 702b might be removed, modified, and installed on landmass C to serve as power feed equipment 702c.

The power conductor of cable 701a is electrically connected to the power conductor of cable 701b. When segment 701b is installed, the current supplied by power feed equipment 702a and 702c must be used by more devices than before, to account for the devices, such as optical repeaters, that may be connected along segment 701b. Accordingly, it may be necessary to modify power feed equipment 702a when segment 701b is installed. The exact modifications will depend on the particular model of power feed equipment used at 702a, and will be understood by those of ordinary skill in the art of communication systems.

As shown in FIGS. 7a and 7b, and as described above, an additional segment may be installed using the present invention while only adding a single additional power feed equipment. An additional piece of power feed equipment may not even be needed if an existing piece of power feed equipment can be modified and transferred. This provides significant cost savings in expanding and operating communication systems.

A preferred embodiment, along with several alternative embodiments, has been described above. However, it will be readily understood by one of ordinary skill in the art that one or more of the advantageous features of these various embodiments may be rearranged and combined to form various alternate embodiments that are based on the teachings disclosed herein. To determine the proper scope of the present invention, reference should be made to the appended claims.

I claim:

1. A method of expanding a communication system comprising the acts of:
    locating an existing communication system including:
        a first and a second landmass having a first and a second piece of power feed equipment, respectively;
        a first underwater cable carrying signals between said first and said second landmass, wherein said first underwater cable includes a first electrical power conductor having a first and a second end electrically connected to said first and said second piece of power feed equipment, respectively; and
        a first repeater electrically connected to said first electrical power conductor;
    laying a second underwater cable carrying signals between said second landmass and a third landmass wherein said first, said second, and said third landmasses are separated by at least one body of water, said second underwater cable including a second electrical power conductor and a second repeater electrically connected to said second electrical power conductor;

providing a third piece of electrical power feed equipment located on said third landmass;

electrically connecting a first end of said second electrical power conductor to said third piece of power feed equipment;

making a permanent electrical connection on said second landmass between second end of said first electrical power conductor and a second end of said second electrical power conductor;

eliminating said second piece of power feed equipment from said communication system such that said first and said second repeater are powered exclusively by said first and said third pieces of power feed equipment; and increasing an electrical power provided by said first piece of power feed equipment in response to said act of eliminating said second piece of power feed equipment from said communication system.

2. The method of claim 1, further comprising the step of relocating the second piece of power feed equipment from the second landmass to the third landmass, wherein said second and said third pieces of power feed equipment are the same.

3. The method of claim 1, wherein said first underwater cable is communicatively coupled for carrying one or more data signals to a first communication network located on the first landmass from a second communication network located on either said second or said third landmasses.

4. A method of expanding a communication system comprising the acts of:

laying a first underwater cable carrying signals between a first and a second landmass, wherein said first underwater cable includes a first electrical power conductor;

electrically connecting a first end of said first electrical conductor to a first piece of power feed equipment located on said first landmass;

electrically connecting a first repeater to said first electrical power conductor;

disconnecting a second end of said first electrical conductor from a second piece of electrical power feed equipment located on said second landmass;

relocating said second piece of electrical power feed equipment from said second landmass to said a third landmass, wherein said first, said second, and said third landmasses are separated by at least one body of water;

laying a second underwater cable carrying signals between said second landmass and said third landmass, said second underwater cable including a second electrical power conductor;

electrically connecting a first end of said second electrical power conductor to said second piece of electrical power feed equipment located on said third landmass;

electrically connecting a second repeater to said second electrical power conductor;

making a permanent electrical connection on said second landmass between said second end of said first electrical power conductor and a second end of said second electrical power conductor; and increasing an electrical power provided by at least one of said first and said second pieces of power feed equipment in response to said act of relocating said second piece of power feed equipment from said second landmass to said third landmass, wherein said first and said second repeaters are powered exclusively by said first and said second pieces of power feed equipment.

5. The method of claim 4, wherein said first underwater cable is communicatively coupled for carrying one or more data signals to a first communication network located on the first landmass from a second communication network located on either said second or said third landmasses.

* * * * *